(12) United States Patent
Mepham

(10) Patent No.: US 11,441,639 B2
(45) Date of Patent: Sep. 13, 2022

(54) POWERTRAIN INTERFACE MODULE

(71) Applicant: ALLISON TRANSMISSION, INC., Indianapolis, IN (US)

(72) Inventor: Shaun Mepham, Clarkston, MI (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 176 days.

(21) Appl. No.: 16/763,858

(22) PCT Filed: Nov. 14, 2018

(86) PCT No.: PCT/US2018/061047
§ 371 (c)(1),
(2) Date: May 13, 2020

(87) PCT Pub. No.: WO2019/099514
PCT Pub. Date: May 23, 2019

(65) Prior Publication Data
US 2021/0172495 A1    Jun. 10, 2021

Related U.S. Application Data

(60) Provisional application No. 62/585,875, filed on Nov. 14, 2017.

(51) Int. Cl.
*F16F 15/129*   (2006.01)
*F16D 43/21*   (2006.01)
*F16D 7/02*   (2006.01)

(52) U.S. Cl.
CPC .......... *F16F 15/1295* (2013.01); *F16D 7/027* (2013.01); *F16D 43/216* (2013.01); *F16F 15/1297* (2013.01)

(58) Field of Classification Search
CPC .. F16F 15/129; F16F 15/1295; F16F 15/1297; F16D 13/64; F16D 7/025;
(Continued)

(56) References Cited

U.S. PATENT DOCUMENTS 4,624,650 A * 11/1986 Hiruma .................. F16D 3/14
192/70.12
5,441,137 A   8/1995 Organ et al.
(Continued)

FOREIGN PATENT DOCUMENTS

EP      3216700 A1 * 9/2017 .......... F16D 43/216
WO  WO-2015110232 A1 * 7/2015 .......... F16F 15/1216

OTHER PUBLICATIONS

PCT Search Report and Written Opinion prepared for PCT/US2018/061047, completed Jan. 9, 2019.

*Primary Examiner* — Ernesto A Suarez
*Assistant Examiner* — Lori Wu
(74) *Attorney, Agent, or Firm* — Barnes & Thornburg LLP

(57) ABSTRACT

Vehicles that are relatively heavy and/or configured to transport heavy loads may utilize a powertrain comprising an electric machine capable of operating at high speeds and a multispeed transmission to propel the vehicle. An interface module is configured to modulate torque between the electric machine and the multispeed transmission allowing the electric machine to smoothly match speed as the multispeed transmission shifts between gears. The interface module facilitates efficient, predictable, and reliable modulation of torque between an input and an output of the powertrain of the vehicle.

19 Claims, 4 Drawing Sheets

(58) Field of Classification Search
CPC ...... F16D 7/027; F16D 43/215; F16D 43/216; F16D 3/14
See application file for complete search history.

(56) References Cited

U.S. PATENT DOCUMENTS

| | | | |
|---|---|---|---|
| 5,908,095 | A | 6/1999 | Jackel et al. |
| 8,414,404 | B2 | 4/2013 | Takenaka et al. |
| 2009/0139825 | A1 | 6/2009 | Sugiyama et al. |
| 2015/0045124 | A1 | 2/2015 | Steinberger et al. |

* cited by examiner

POWERTRAIN INTERFACE MODULE

CROSS-REFERENCE TO RELATED APPLICATIONS

The subject patent application is the U.S. national phase of PCT/US2018/061047, filed on Nov. 14, 2018, which claims priority to and all the benefits of Provisional Application No. 62/585,875, filed Nov. 14, 2017, the disclosure of both of which are hereby incorporated by reference in its entirety for all purposes.

BACKGROUND

The present invention relates, generally, to vehicle powertrains and, more specifically, to a powertrain interface module having a torsional damper assembly and an overload clutch assembly.

SUMMARY

An interface module for use in a vehicle powertrain for modulating torque between an input and an output is disclosed. The interface module comprises an input drum defining an interior and a rotational axis and having a drive hub facing the interior. The input drum is configured for receiving torque from the input and for rotating about the rotational axis when torque is received. The interface module further comprises an output shaft extending along the rotational axis and at least partially disposed in the interior of the input drum for transferring torque to the output and rotating about the rotational axis when torque is received, and a torsional damper assembly disposed in the interior of the input drum about the rotational axis and operatively arranged between the input drum and the output shaft. The torsional damper assembly comprises an input-side damper body having a first ramp arrangement and an output-side damper body coupled to the output shaft and having a second ramp arrangement disposed in resilient engagement with the first ramp arrangement. The output-side damper body is arranged to move axially along the rotational axis between a first engagement position and a second engagement position, the second engagement position defined by a predetermined torque differential between the input and the output. The torsional damper assembly further comprises a damper preload member abutting the output-side damper body to urge the output-side damper body arrangement toward the first engagement position. The torsional damper assembly further comprises an overload clutch including an inner clutch plate mounted to the drive hub and an outer clutch plate mounted to the input-side damper body.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION

Figure 1:
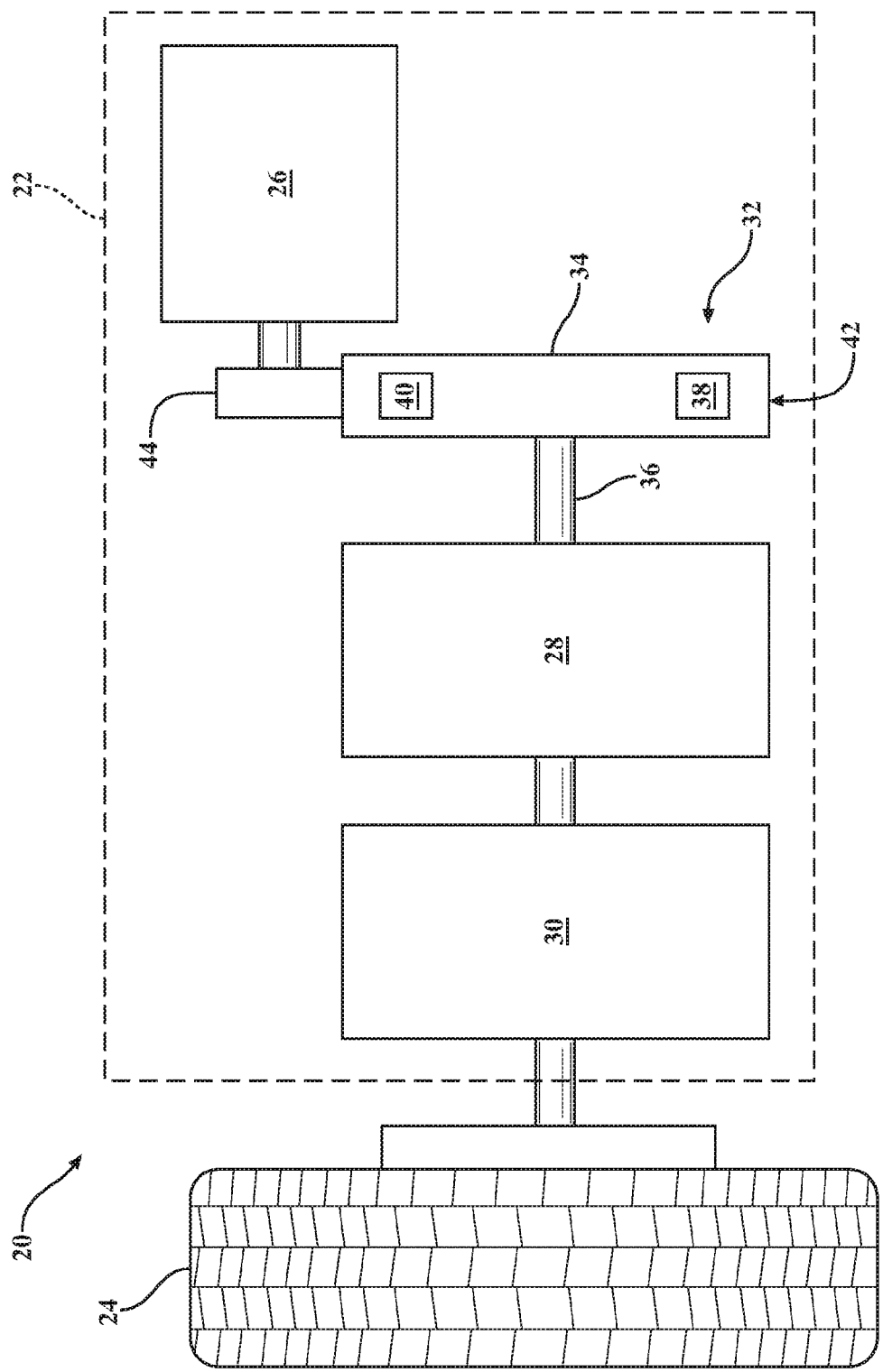
FIG. 1 is a schematic view of a vehicle powertrain shown having an electric machine, a multispeed transmission, a final drive assembly coupled to a wheel, and an interface module according to one embodiment of the present invention.

Referring now to the drawings, where like numerals indicate like or corresponding parts throughout the several views, FIG. 1 schematically depicts portions of a vehicle, generally indicated at 20. As is described in greater detail below, the vehicle 20 comprises a powertrain 22 configured to generate torque at an input used to rotate one or more wheels 24 at an output for propelling the vehicle 20 during use. To this end, the representative embodiment of the powertrain 22 illustrated herein comprises a prime mover realized as an electric machine 26 configured to generate torque and rotation which, in turn, is translated to a multispeed transmission 28. The multispeed transmission 28 cooperates with a final drive assembly 30 to adjust output characteristics of the electric machine 26, such as to translate torque at different rotational speeds and different torques to the wheel 24 in order to facilitate optimized acceleration and propulsion of the vehicle 20. To this end, the multispeed transmission 28 may facilitate changing between discrete "gear sets" to translate torque at a plurality of predetermined rates to effect corresponding changes in the rotational speed of the wheel 24. The final drive assembly 30 is employed to further adjust torque translated by the multispeed transmission 28, such as at a predetermined final drive ratio, before subsequently directing further-adjusted torque to the wheel 24.

In the illustrated embodiment, the final drive assembly 30 is interposed between the multispeed transmission 28 and the wheel 24. However, it will be appreciated that the final drive assembly 30 could be formed as a part of the multispeed transmission 28 in some embodiments. Moreover, it will be appreciated that the final drive assembly 30 could be realized in a number of different ways, such as with a ring and pinion arrangement, one or more planetary gear sets, a portal gear set, and the like. Furthermore, depending on the specific configuration of the vehicle 20 and/or the powertrain 22, the final drive assembly 30 could be positioned differently relative to the input and the output along the "torque flow path" between the wheel 24, the electric machine 26, and/or the multispeed transmission 28, or could be omitted entirely from some embodiments. As will be appreciated from the subsequent description below, the multispeed transmission 28 could be configured in any suitable way sufficient to effect translating torque between the electric machine 26 and the wheel 24 at different speed ratios without departing from the scope of the present invention.

While the powertrain 22 illustrated schematically in FIG. 1 is configured to propel the vehicle 20 using torque generated by the electric machine 26, it will be appreciated that the vehicle 20 could also be provided with additional components, systems, and the like that cooperate to facilitate acceleration and/or propulsion of the vehicle 20. By way of non-limiting example, discrete powertrains 22 of the type described herein could be employed at multiple locations on a single vehicle 20 to each independently drive respective wheels 24 of the same vehicle 20. In addition, while the illustrated powertrain 22 is shown as being configured to drive a single wheel 24, it is conceivable that the powertrain 22 could further comprise a differential (not shown) to facilitate driving multiple wheels 24 with torque generated by the same electric machine 26. Furthermore, it will be appreciated that the vehicle 20 could comprise additional systems and components, beyond the components of the illustrated powertrain 22, to facilitate acceleration and/or propulsion of the vehicle 20. By way of non-limiting example, an internal combustion engine (not shown) could also be employed to generate torque used to drive the wheel 24 of the illustrated powertrain 22, and/or to drive other wheels of the vehicle 20. Other configurations are contemplated.

Those having ordinary skill in the art will appreciate that it is desirable to change (or shift) between gear sets in the multispeed transmission 28 in a smooth and controller manner. One method generally involves interrupting torque to modulate rotational velocity of the prime mover and/or the multispeed transmission 28 to match speed when changing between gear sets. In the related art, various combinations of friction-type clutches and interference-type clutches are commonly utilized for this purpose in connection with vehicles 20, whereby friction-type clutches, either alone or in combination with interference-type clutches, are used to modulate torque. However, depending on the specific configuration and intended use of the vehicle 20, it may be impractical to utilize conventional friction-type clutches alone for certain applications, such as where the vehicle 20 is configured for commercial or industrial use and is relatively heavy and/or is used to transport heavy loads. It will be appreciated that the substantial amount of torque needed to propel a heavy vehicle 20 generally results in a correspondingly-substantial load on the powertrain 22 which, in turn, tends to make friction-type clutches slip. Moreover, even where conventional interference-type clutches and friction-type clutches are used in combination to facilitate torque modulation without slipping under heavy load (such as with a dog clutch and a synchronizer), they can be expensive to manufacture, difficult to package, and may have a short useful life. Furthermore, when used in connection with electric machines 26, which are capable of efficiently generating torque across broad ranges of relatively high rotational velocities (for example, 25,000 RPM) in comparison to conventional internal combustion engines (for example, 5,000 RPM), it can be extremely difficult to for an interference-type clutch to withstand impact forces encountered during a gear change where a high-speed electric machine 26 is used in connection with a relatively heavy vehicle 20.

As is explained in greater detail below, the present invention is directed toward an interface module, generally indicated at 32, which overcomes the disadvantages described above by facilitating modulation of torque through the powertrain 22 of the vehicle 20 in an efficient, predictable, and reliable manner, in particular when used in connection with electric machines 26 that are capable of operating at high speeds to propel vehicles 20 that are relatively heavy and/or configured to transport heavy loads. The interface module 32 is configured for use in the powertrain 22 for modulating torque between the input and the output.

Figure 2:
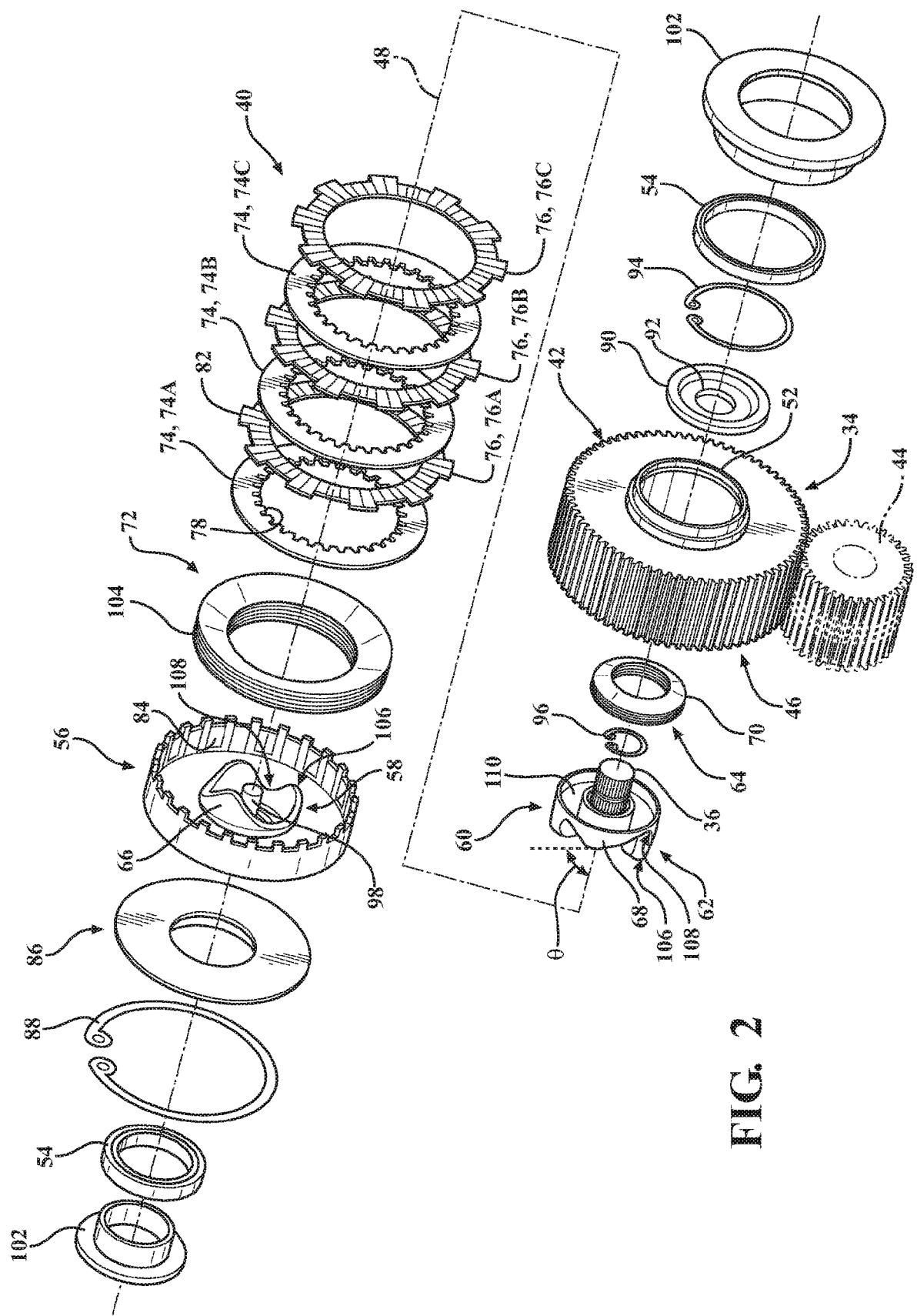
FIG. 2 is an exploded perspective view of the interface module of FIG. 1 shown having a torsional damper assembly.

Referring now to FIGS. 1-2, the interface module 32 generally comprises an input drum 34, an output shaft 36, a torsional damper assembly 38, and an overload clutch assembly 40. As is depicted schematically in FIG. 1, the input drum 34 of the interface module 32 is configured for receiving torque from the input and for rotating when torque is received. Similarly, the output shaft 36 is configured for transferring torque to the output and for rotating therewith.

In the embodiment shown, the interface module 32 includes a drive gear 42 coupled to the input drum 34 for concurrent rotation. The drive gear 42 is disposed in meshed-engagement with the input, shown here as an input pinion 44 coupled to the electric machine 26, and the output shaft 36 of the interface module 32 is disposed in rotational communication with the multispeed transmission 28.

Figure 3A:
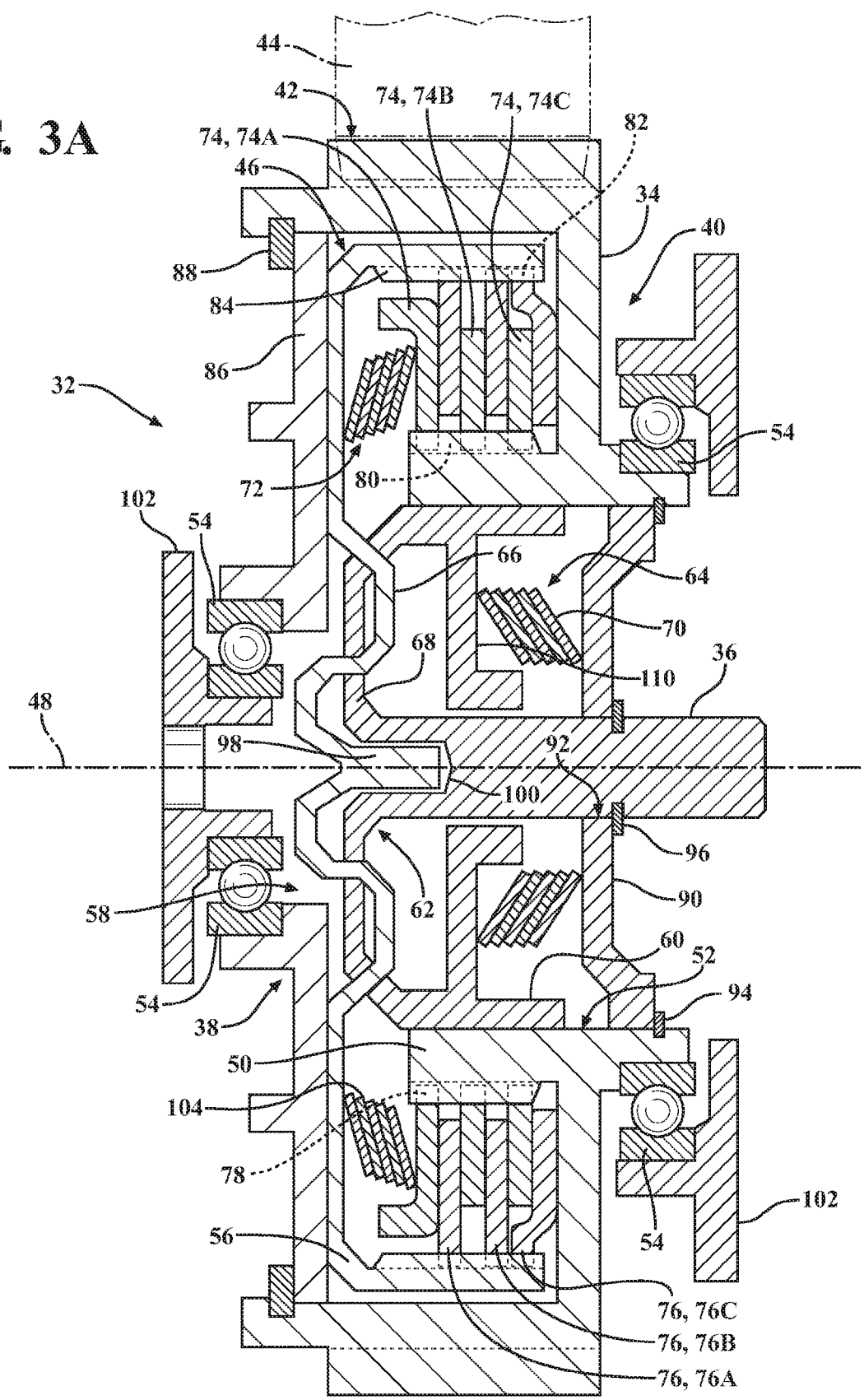
FIG. 3A is a section view of the interface module of FIG. 1 with the torsional damper assembly shown in a first engagement position.
Figure 3B:
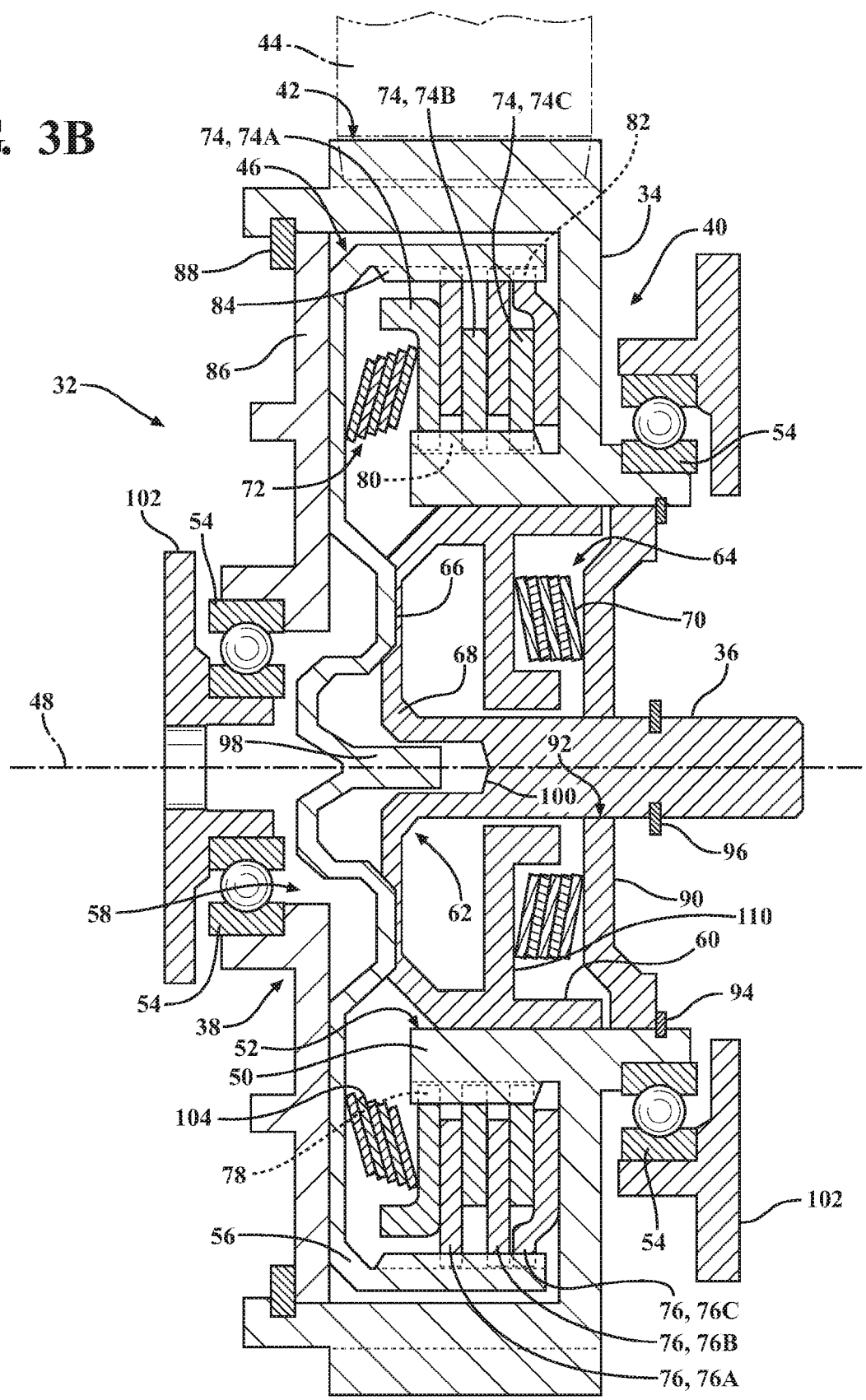
FIG. 3B is a section view of the interface module of FIG. 1 with the torsional damper assembly shown in a second engagement position.

Referring now to FIGS. 2-3B, the interface module 32 is shown both in an exploded perspective view and in a section view. The input drum 34 defines an interior 46 and a rotational axis 48, and has a drive hub 50 facing the interior 46 and extending along the rotational axis 48. The input drum 34 further defines a bore 52 extending through the drive hub 50 along the rotational axis 48 and radially inward of the drive hub 50. The input drum 34 is configured for receiving torque from the input pinion 44 and for rotating about the rotational axis 48 when torque is received. As will be discussed in further detail below, the overload clutch 40 is operatively arranged between the torsional damper assembly 38 and the drive hub 50 of the input drum 34.

The vehicle 20 includes a housing 102 that generally supports and otherwise accommodates various components of the powertrain 22. Here, the interface module 32 is rotatably supported in the housing 102 by bearings 54, discussed in further detail below. It is contemplated that the interface module 32 could be constructed without the bearings 54 and integrated into the input or the output. While the interface module 32 is schematically depicted in FIG. 1 with both the torsional damper assembly 38 and the overload clutch assembly 40 being supported in the input drum 34, it will be appreciated that the interface module 32 could be arranged differently in some embodiments. By way of non-limiting example, it is conceivable that the torsional damper assembly 38 could be interposed between the multispeed transmission 28 and the final drive assembly 30, while the overload clutch assembly 40 could remain supported in the housing 102 interposed between the multispeed transmission 28 and the electric machine 26.

Depicted in FIGS. 3A and 3B, the torsional damper assembly 38 is disposed in the interior 46 of the input drum 34 about the rotational axis 48 and operatively arranged between the input drum 34 and the output shaft 36. The output shaft 36 extends along the rotational axis 48 and is at least partially disposed in the interior 46 of the input drum 34. The torsional damper assembly 38 comprises an input-side damper body 56 rotatable about the rotational axis 48 and having a first ramp arrangement 58, and an output-side damper body 60 coupled to the output shaft 36 and having a second ramp arrangement 62 disposed in resilient engagement with the first ramp arrangement 58. The input-side damper body 56 is arranged with the drive hub 50 arranged radially inward of the overload clutch 40 and a portion of the input-side damper body 56. The output-side damper body 60 is rotatable about the rotational axis 48 and arranged to move axially along the rotational axis 48 relative to the input-side damper body 56. The output-side damper body 60 is movable between a first engagement position (shown in FIG. 3A) and a second engagement position (shown in FIG. 3B) defined by a predetermined torque differential between the input drum 34 and the output shaft 36. The first ramp arrangement 58 and the second ramp arrangement 62 abut each other in both the first and second engagement positions. The predetermined torque differential occurring between the input drum 34 and the output shaft 36 moves the second ramp arrangement 62 away from the first ramp arrangement 58 axially along the rotational axis 48 and toward the second engagement position.

In the embodiment shown, the first ramp arrangement 58 comprises a plurality of input lobes 66 and the second ramp arrangement 62 comprises a plurality of output lobes 68. Each input lobe 66 and output lobe 68 defines a ramp angle θ, with the ramp angle θ being between 35 degrees and 45 degrees. Each of the input lobes 66 and the output lobes 68 has a respective crest 106. A valley 108 is defined between each adjacent input lobe 66 and each adjacent output lobe 68 with the crests 106 and valleys 108 having complementary profiles.

The output-side damper body 60 defines a pocket 110 opposite the second ramp 62. The pocket 110 has an annular profile coaxial with the rotational axis 48 and radially outward of the output shaft 36. The output shaft 36 protrudes through the pocket 110 away from the second ramp arrangement 62 and defines a recess to receive an external snap-ring 96, discussed in further detail below. In the illustrated embodiment the output shaft 36 is integrally formed with the output-side damper body 60, however it should be appreciated that the output shaft 36 may be coupled to the output-side damper body 60 using other methods known in the art. For example, the output shaft 36 may be splined or otherwise keyed to the output-side damper body 60, or may be fixed by welding or a threaded fastener (not shown).

Relative movement between the second ramp arrangement 62 and the first ramp arrangement 58 causes the output lobes 68 to slide against the input lobes 66, following the profile of the crest 106. The complementary crest 106 and valley 108 profiles guide the output lobe 68 into a stability condition with the input lobe 66 wherein the first ramp arrangement 58 and the second ramp arrangement 62 are fully engaged with each other in equilibrium. More specifically, the first engagement position of the output-side damper body 60 is defined when the crests 106 and the valleys 108 of the second ramp arrangement 62 nest with the crests 106 and the valleys 108 of the first ramp arrangement 58. Movement of the output lobe 68 and the input lobe 66 away from equilibrium causes corresponding movement of the second ramp arrangement 62 relative to the first ramp arrangement 58, with the first engagement position of the second ramp arrangement 62 corresponding to equilibrium of the output lobe 68 and the input lobe 66. This movement of the second ramp arrangement 62 relative to the first ramp arrangement 58 is translated into axial displacement and angular displacement of the second ramp arrangement 62 proportional to the ramp angle θ. Minimum axial displacement and angular displacement are achieved in the first engagement position, with the second engagement position defined by axial displacement and angular displacement greater than the minimum.

Movement of the second ramp arrangement 62 between the first engagement position and the second engagement position is responsive to a difference in torque between the input and the output. Said differently, a torque differential between the input and the output acts to move the second ramp arrangement 62 and the first ramp arrangement 58 relative to each other. The torsional damper assembly 38 further comprises a damper preload member 64 abutting the output-side damper body 60 to urge the output-side damper body 60 into the first engagement position. The damper preload member 64 is disposed in the pocket 110 and generally coaxial with the rotational axis 48. Here, the damper preload member 64 comprises at least one disc spring 70 arranged about the rotational axis 48 for opposing axial displacement of the output-side damper body 60. The damper preload member 64 must be compressed by the output-side damper body 60 to move the output-side damper body 60 away from the first engagement position. The predetermined torque differential is the amount of torque applied to the output shaft 36 and the second ramp arrangement 62 to generate an axial force that overcomes the force to compress the damper preload member 64.

As mentioned above the overload clutch assembly 40 is operatively arranged between the input-side damper body 56 and the drive hub 50 of the input drum 34. The overload clutch assembly 40 is configured to limit the amount of torque that can be translated between the electric machine 26 and the wheel 24 and vice versa. The maximum torque that can be translated through the overload clutch assembly 40 is referred to as a capacity. By way of non-limiting example, the overload clutch assembly 40 may be configured to "slip" in response to a differential torque occurring between the electric machine 26 and the final drive assembly 30 which exceeds 120% of the maximum torque output of the electric machine 26, caused such as via a torque spike resulting from shifting the multispeed transmission 28. The overload clutch assembly 40 is operable between a first mode rotatably coupling the input drum 34 and the input-side damper body 56, and a second mode permitting relative rotation of the input drum 34 and the input-side damper body 56. The overload clutch assembly 40 includes a clutch biasing member 72, an inner clutch plate 74 mounted to the drive hub 50 and an outer clutch plate 76 mounted to the input-side damper body 56, each of the inner clutch plate 74 and the outer clutch plate 76 being disposed between the clutch biasing member 72 and the input drum 34. The clutch biasing member 72 is configured to urge the overload clutch assembly 40 into the first mode, in which the inner clutch plate 74 and the outer clutch plate 76 are rotatably fixed to transfer torque and rotation between the input drum 34 and the torsional damper assembly 38. In the second mode the inner clutch plate 74 and the outer clutch plate 76 rotate relative to each other, or "slip", limiting the amount of torque transferred between the input drum 34 and the torsional damper assembly 38.

In the embodiment shown, the overload clutch assembly 40 is a friction clutch, with the inner clutch plate 74 further defined as a plurality of inner clutch plates 74A, 74B, 74C, and the outer clutch plate 76 further defined as a plurality of outer clutch plates 76A, 76B, 76C. It should be appreciated that alternative configurations of an overload or torque limiting clutch may be implemented. For example, the overload clutch 40 may comprise an electromagnetic coupling, wherein the input drum 34 and the input-side damper body 56 are magnetically coupled for concurrent rotation.

With continued reference to FIGS. 3A and 3B, the inner clutch plates 74 are supported for concurrent rotation on the drive hub 50 of the input drum 34. Each inner clutch plate 74 defines an inner splined feature, generally indicated at 78, and the drive hub 50 defines an outer splined feature 80 configured for engagement with the inner splined feature 78 of the inner clutch plates 74. Similarly, the outer clutch plates 76 are supported for concurrent rotation in the input-side damper body 56 of the torsional damper assembly 38. Each outer clutch plate 76 defines an outer engagement feature, generally indicated at 82, and the input-side damper body 56 defines an inner engagement feature 84 configured for engagement with the outer engagement feature 82 of the outer clutch plates 76. The inner clutch plates 74 rotate concurrently with the input drum 50, and the outer clutch plates 76 rotate concurrently with the input-side damper body 56.

In addition to the inner and outer clutch plates 74, 76, the overload clutch assembly 40 may also comprise an output-side clutch end plate 76C and an input-side clutch end plate 74A. The output-side clutch end plate 76C is disposed in abutment with the input drum 34 and with one of the inner clutch plates 74 for concurrent rotation with the input-side damper body 56 via the inner engagement feature 78. Conversely, the input-side clutch end plate 74A is disposed in abutment with the clutch biasing member 72 and with one of the outer clutch plates 76 for concurrent rotation with the drive hub 50 via the outer splined feature 80.

In the illustrated embodiment and as mentioned above, the damper preload member 64 comprises at least one disc spring 70. The clutch biasing member 72 is similarly configured and may also comprise at least one disc spring 104 arranged about the rotational axis 48 for biasing the overload clutch 40 into the first mode. Each of the disc springs 70, 104 may be realized as a stack of coned-shaped disc springs, which advantageously exert relatively high force at relatively low displacement. However, it will be appreciated that other configurations are contemplated and, thus, the clutch biasing member 72 could be configured in any suitable way sufficient to energize the overload clutch assembly 40, and the damper preload member 64 could be configured in any suitable way sufficient to energize the torsional damper assembly 38. By way of non-limiting illustration, the damper preload member 64 and the clutch biasing member 72 could be realized as coil springs. Other configurations are contemplated.

With continued reference to FIGS. 2-3B, the interface module 32 further includes an input drum cover 86, which abuts the output-side damper body 60 and is restricted from moving axially relative to the input drum 34 by a first internal snap ring 88. A damper cover 90 is disposed in the bore 52 of the input drum 34 and arranged in abutment with the damper preload member 64. The pocket 110 of the output-side damper body 60 faces the damper cover 90 with the damper preload member 64 disposed in the pocket 110 and abutting the damper cover 90. The damper cover 90 defines an opening 92 along the rotational axis 48 for receiving the output shaft 36. Here, it will be appreciated that the output-side damper body 60 is not splined to the input drum 34 and is able to translate axially relative to the input drum 34 and to rotate relative to the input drum 34. The damper cover 90 is restricted from moving axially in one direction relative to the input drum 34 via a second internal snap ring 94, and the damper cover 90 is restricted from moving axially relative to the output shaft 36 by an external snap ring 96. Thus, the first internal snap ring 88, the second internal snap ring 94, and the external snap ring 96 cooperate to limit the amount of axial displacement that can occur between the input drum cover 86 and the damper cover 90, which in turn limit the amount of axial movement that can occur between the first ramp arrangement 58 and the second ramp arrangement 62.

As mentioned above, bearings 54 support the input drum 34 and the input drum cover 86 for rotation relative to the housing 102. The torsional damper assembly 38 further comprises a pilot shaft 98 coupled to the input-side damper body 56 and extending along the rotational axis 48, and a pilot bushing 100 coupled to the output-side damper body 60 for engaging the pilot shaft 98. The pilot shaft 98 is rotatably supported by the pilot bushing 100 to help promote concentric alignment relative to the overload clutch assembly 40. However, because the interface module 32 can be configured in different ways, such as where the overload clutch assembly 40 is not supported within the input drum 34 as noted above, it will be appreciated that concentric alignment can be achieved differently without departing from the scope of the present invention.

The first and second ramp arrangements 58, 62 cooperate with the overload clutch 40 in order to facilitate operation of the torsional damper assembly 38. When opposing forces acting between the input and the output of the powertrain 22 overcome the predetermined torque differential, such as via a torque spike resulting from shifting the multispeed transmission 28, the shape and arrangement of the input lobe 66 and the output lobe 68 cause the second ramp arrangement 62 to rotate relative to the first ramp arrangement 58 and translate axially. Kinetic energy from the torque spike is absorbed by the damper preload member 64 due to the axial translation of the second ramp arrangement 62. This dampens the torque spike occurring between the electric machine 26 and the multispeed transmission 28 without interrupting torque translation. Energy absorbed by the damper preload member 64 is dissipated in two forms. Force from the damper preload member 64 urges the first and second ramp arrangements 58, 62 back into equilibrium, where torque is returned to the output shaft 36 at a lower rate. If excess energy above a predetermined level is absorbed by the damper preload member 64, the torque will exceed the capacity of the overload clutch assembly 40 and cause the outer clutch plates 76 to slip relative to the inner clutch plates 74. When the outer clutch plates 76 slip, the input-side damper body 56 briefly accelerates allowing the first ramp arrangement 58 to return to equilibrium with the second ramp arrangement 62. In this way, excess energy from torque spikes is dissipated as heat generated by friction between the inner and outer clutch plates 74, 76. Thus, the torsional damper assembly 38 dampens differential torque occurring between the electric machine 26 and the multispeed transmission 28, and the overload clutch assembly 40 limits the maximum amount of torque that can be translated between the electric machine 26 and the wheel 24.

In this way, the torsional damper assembly 38 and the overload clutch assembly 40 of the interface module 32 of the present invention afford significant advantages for powertrains 22 that employ multispeed transmissions 28, in particular when used in connection with electric machines 26 that operate at relatively high rotational velocities and/or when used in connection with relatively heavy commercial or industrial vehicles 20 where significant amounts of torque are involved in achieving application-specific vehicle 20 acceleration and propulsion requirements. Specifically, it will be appreciated that the interface module 32 of the present invention allows the electric machine 26 to smoothly match speed as the multispeed transmission 28 shifts between gears in an efficient, predictable, and reliable manner without necessitating the use of expensive components, complex control systems, and/or structural features that are unreliable when used in connection with high-torque and high-speed applications.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. An interface module for use in a vehicle powertrain for modulating torque between an input and an output, said interface module comprising:
an input drum defining an interior and a rotational axis with said input drum having a drive hub facing said interior, said input drum configured for receiving torque from the input and for rotating about said rotational axis when torque is received;
an output shaft extending along said rotational axis and at least partially disposed in said interior of said input drum for transferring torque to the output and rotating about said rotational axis when torque is received; and
a torsional damper assembly disposed in said interior of said input drum about said rotational axis and operatively arranged between said input drum and said output shaft, said torsional damper assembly comprising:
an input-side damper body rotatable about said rotational axis and having a first ramp arrangement;
an overload clutch having an inner clutch plate mounted to said drive hub and an outer clutch plate mounted to said input-side damper body with said inner and outer clutch plates rotatable relative to each other when said input-side damper body rotates relative to said drive hub;
an output-side damper body coupled to said output shaft and having a second ramp arrangement disposed in resilient engagement with said first ramp arrangement, said output-side damper body rotatable about said rotational axis and arranged to move axially along said rotational axis between a first engagement position and a second engagement-position with said first and second ramp arrangements abutting each other when in both of said first and second engagement positions and said second engagement position defined by a predetermined torque differential between said input drum and said output shaft; and a damper preload member abutting said output-side damper body to urge said output-side damper body into said first engagement position;
wherein said input drum defines a bore with said output-side damper body of said torsional damper assembly disposed in said bore.

2. The interface module as set forth in claim 1, wherein said first ramp arrangement and said second ramp arrangement are configured such that said predetermined torque differential occurring between said input drum and said output shaft moves said second ramp arrangement away from said first ramp arrangement axially along said rotational axis and toward said second engagement position.

3. The interface module as set forth in claim 1, wherein said drive hub is arranged radially inward of said overload clutch and a portion of said input-side damper body.

4. The interface module as set forth in claim 1, further comprising a damper cover disposed in said bore and abutting said damper preload member.

5. The interface module as set forth in claim 4, wherein said output-side damper body defines a pocket facing said damper cover with said damper preload member disposed in said pocket and abutting said damper cover.

6. The interface module as set forth in claim 4, further comprising an input drum cover coupled to said input drum and abutting said input-side damper body, said input drum and said damper cover cooperating to limit said axial movement of said output-side damper body along said rotational axis.

7. The interface module as set forth in claim 1, wherein said overload clutch includes a clutch biasing member with said overload clutch being operable between a first mode rotatably coupling said input drum and said input-side damper body and a second mode permitting said relative rotation of said inner and outer clutch plates to decouple said input drum and said input-side damper body with said clutch biasing member urging said overload clutch into said first mode.

8. The interface module as set forth in claim 7, wherein said clutch biasing member comprises at least one disc spring.

9. The interface module as set forth in claim 1, wherein said damper preload member comprises at least one disc spring.

10. The interface module as set forth in claim 1, wherein said first engagement position of said output-side damper body is defined by said second ramp arrangement fully engaging said first ramp arrangement, and said second engagement position is defined by said second ramp arrangement partially engaging said first ramp arrangement.

11. The interface module as set forth in claim 1, wherein said first ramp arrangement comprises an input lobe and said second ramp arrangement comprises an output lobe configured for complementary engagement with said input lobe.

12. The interface module as set forth in claim 11, wherein each of said input lobe and said output lobe define a ramp angle with said ramp angle being between 35 degrees and 45 degrees.

13. The interface module as set forth in claim 11, wherein said input lobe is further defined as a plurality of input lobes and said output lobe is further defined as a plurality of output lobes.

14. The interface module as set forth in claim 13, wherein a valley is defined between each adjacent input lobe and each adjacent output lobe with each of said input lobes and said output lobes having a crest, and wherein said first engagement position of said output-side damper body is defined when said crests and said valleys of said second ramp arrangement nest with said crests and said valleys of said first ramp arrangement.

15. The interface module as set forth in claim 1, wherein said overload clutch is further defined as a friction clutch;
wherein said inner clutch plate is further defined as a plurality of inner clutch plates; and wherein said outer clutch plate is further defined as a plurality of outer clutch plates.

16. An interface module for use in a vehicle powertrain for modulating torque between an input and an output, said interface module comprising:
an input drum defining an interior and a rotational axis with said input drum having a drive hub facing said interior, said input drum configured for receiving torque from the input and for rotating about said rotational axis when torque is received;
an output shaft extending along said rotational axis and at least partially disposed in said interior of said input drum for transferring torque to the output and rotating about said rotational axis when torque is received; and
a torsional damper assembly disposed in said interior of said input drum about said rotational axis and operatively arranged between said input drum and said output shaft, said torsional damper assembly comprising:

an input-side damper body rotatable about said rotational axis and having a first ramp arrangement;

an overload clutch having an inner clutch plate mounted to said drive hub and an outer clutch plate mounted to said input-side damper body with said inner and outer clutch plates rotatable relative to each other when said input-side damper body rotates relative to said drive hub;

an output-side damper body coupled to said output shaft and having a second ramp arrangement disposed in resilient engagement with said first ramp arrangement, said output-side damper body rotatable about said rotational axis and arranged to move axially along said rotational axis between a first engagement position and a second engagement-position with said first and second ramp arrangements abutting each other when in both of said first and second engagement positions and said second engagement position defined by a predetermined torque differential between said input drum and said output shaft and a damper preload member abutting said output-side damper body to urge said output-side damper body into said first engagement position;

wherein said input-side damper body defines an inner engagement feature and said outer clutch plate defines an outer engagement feature configured for complementary engagement with said inner engagement feature for rotatably coupling said input-side damper body to said outer clutch plate.

17. The interface module as set forth in claim 16, wherein said drive hub defines an outer splined feature and said inner clutch plate defines an inner splined feature configured for complementary engagement with said outer splined feature for rotatably coupling said drive hub to said inner clutch plate.

18. The interface module as set forth in claim 16, wherein said input-side damper body has a pilot shaft extending along said rotational axis and said output-side damper body has a pilot bushing for rotatably supporting said pilot shaft.

19. The interface module as set forth in claim 16, wherein said output shaft is integrally formed with said output-side damper body.

* * * * *